United States Patent [19]
Pravda

[11] Patent Number: 5,846,299
[45] Date of Patent: *Dec. 8, 1998

[54] RECOVERING WATER SOLUBLE, VOLATILE, ORGANIC COMPOUNDS FROM BAKERY AND OTHER PLANT EMISSIONS

[75] Inventor: Milton F. Pravda, Towson, Md.

[73] Assignee: Conserve Resources, Inc., Lutherville, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 748,247

[22] Filed: Nov. 12, 1996

Related U.S. Application Data

[60] Provisional application No. 60/021,303 Jul. 8, 1996.

[51] Int. Cl.$^6$ .................................................. B01D 47/06
[52] U.S. Cl. ................................ 95/187; 95/214; 95/227; 95/228; 95/237; 96/242; 96/322; 96/355
[58] Field of Search .......................... 95/237, 227, 228, 95/178, 184, 187, 194, 214, 216, 220; 55/267, 268, 269, 222, 240, 257.1

[56] References Cited

U.S. PATENT DOCUMENTS

| | | | |
|---|---|---|---|
| 2,192,126 | 2/1940 | Downs ...................................... | 95/194 |
| 2,355,828 | 8/1944 | Taylor ...................................... | 95/194 |
| 2,367,695 | 1/1945 | Spiselman ................................ | 95/228 |
| 2,876,833 | 3/1959 | Kelley et al. ............................. | 55/222 |
| 3,018,231 | 1/1962 | Valentine et al. ......................... | 55/222 |
| 3,629,997 | 12/1971 | DeMuth .................................... | 95/237 |
| 4,218,389 | 8/1980 | Jackson et al. ............................ | 95/187 |
| 4,472,179 | 9/1984 | Adrian et al. ............................. | 55/222 |
| 4,574,062 | 3/1986 | Weitman .................................... | 55/222 |
| 5,079,025 | 1/1992 | Zobel et al. .............................. | 95/237 |
| 5,123,479 | 6/1992 | Pravda ..................................... | 165/86 |

FOREIGN PATENT DOCUMENTS

| | | | |
|---|---|---|---|
| 592959 | 8/1925 | France .................................... | 95/194 |
| 1087929 | 3/1955 | France . | |
| 242820 | 2/1987 | Germany . | |
| 61-138517 | 6/1986 | Japan ..................................... | 55/222 |
| 42787 | 9/1975 | Romania . | |

OTHER PUBLICATIONS

Organic Chemistry, By Frank C. Whitmore, Aug. 1938 D. Van Nostrand Company, Inc. pp. 107 and 108.

*Primary Examiner*—Duane S. Smith
*Attorney, Agent, or Firm*—Olson and Olson

[57] ABSTRACT

Recovery of ethanol from the exhaust stacks of a bread-baking oven is achieved by passing the stack emissions through an adiabatic humidifier where the emissions are humidified to near saturation. The unevaporated water content of the humidifier is collected for separation of the ethanol content. The humidified emissions are passed from the humidifier to the vaporization chamber of a heat exchanger where the gas content of the humidified emissions is separated from the moisture content thereof, and the moisture content is collected for recovery of the ethanol content.

3 Claims, 1 Drawing Sheet

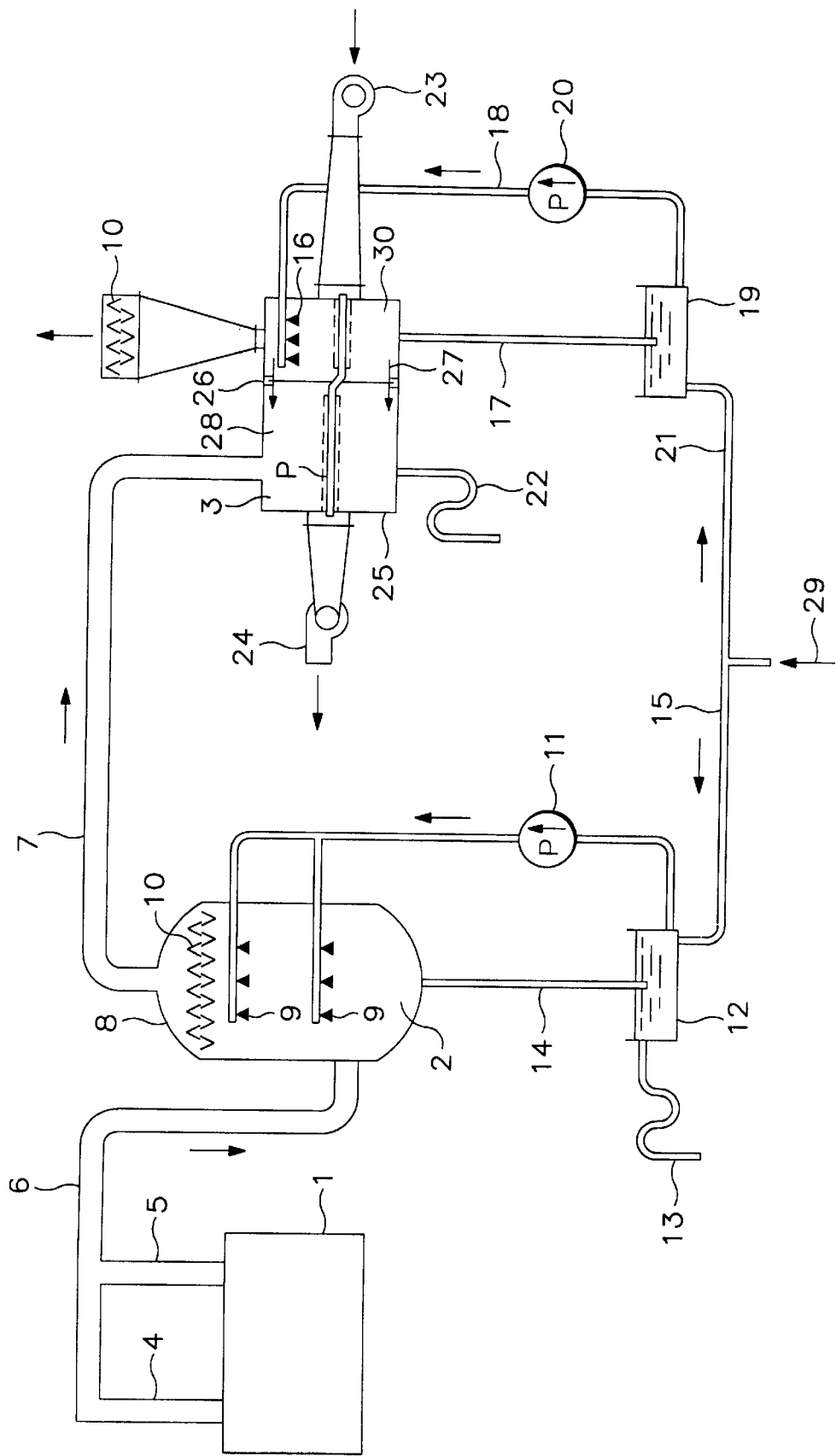

RECOVERING WATER SOLUBLE, VOLATILE, ORGANIC COMPOUNDS FROM BAKERY AND OTHER PLANT EMISSIONS

This application claims the benefit of U.S. Provisional application Ser. No. 60/021,303, filed 8 Jul., 1996, now abandonded.

BACKGROUND OF THE INVENTION

This invention relates to the recovery of water soluble, volatile, organic compounds from bakery and other plant emissions, and more particularly to the removal and recovery of ethanol and particulates from the exhaust airstream of bread baking ovens and other fermentation procedures.

Ground-level ozone in concentrations of one part per million in air may cause headaches and irritations of the upper respiratory tract. These symptoms are especially harmful to the elderly. Ethanol is a known precursor of ozone. It is a product of the fermentation process wherein yeast is employed to leaven bread. The Environmental Protection Agency of the United States Government has determined that large commercial baking ovens require ethanol abatement systems in order to reduce the amount of ethanol exhausted from the ovens to the environment and, thereby, reduce atmospheric ozone concentrations.

Prior to the recognition of the production of ozone by ethanol, investigators have explored the commercial possibility of recovering ethanol from the aforementioned fermentation processes. French Patent No. 1,087,929 published on 1 Mar., 1955, discloses a method of removing organic products from fermentation processes by means of humidification and condensation of the effluent airstream. Humidification is achieved by an injector and concentration is achieved by means of two condensers in series, all of which are located in the exhaust airstream of a bread-baking oven. Large amounts of cooling water or refrigerant are required in the condensation process.

Romanian Patent No. 42,787 published on 30 Sep., 1975, discloses a method of extracting ethanol from bread-baking ovens comprising a column of trays located in the oven exhaust airstream followed by a water-cooled condenser for extracting ethanol from the airstream. Large amounts of water are required in the tray column.

Both the French and Romanian patents are concerned with recovering ethanol for its commercial value. The systems described in those patents are supposedly optimized thereto and are not supposedly optimized to remove the greater fraction of ethanol in order to meet Environmental Protection Agency regulations.

Heretofore in the United States the commonly used systems to reduce ethanol and other pollutants to regulatory levels have been direct incineration and catalytic incineration. Direct incineration requires the use of large amounts of energy to raise the process exhaust-gas temperatures above 1400° F., which temperature is required for effective removal of the pollutants. Catalytic incineration is able to achieve the same removal at about one-half this gas temperature and, consequently, at a lesser usage of energy. Counterveiling the lesser energy usage is the occasional need to replace the catalyst when it becomes contaminated.

Commonly employed chemical engineering methods may be adapted to reduce the ethanol in the oven exhaust airstream to environmentally acceptable levels. For example, packed columns may be employed. These columns operate in a manner similar to the tray columns of Romanian Patent No. 42,787. Packed columns require large amounts of cool, fresh water in order to reduce the ethanol concentration to acceptable levels.

SUMMARY OF THE INVENTION

In its basic concept, this invention recovers ethanol and other volatiles from bakery and other plant emissions by passing the emissions through an adiabatic humidifier to humidify the emissions to near saturation, collecting the unevaporated water content of the humidifier for separation of the ethanol content thereof, passing the humidified emissions from the humidifier to the vaporization chamber of a heat exchanger for separation of the gas content of the humidified emissions from the moisture content thereof, and condensing and collecting the moisture content for separation of the ethanol content thereof.

It is the principal objective of this invention to provide method and apparatus by which to reduce the amount of solvent soluble, volatile, organic compounds, such as ethanol, and particulates, discharged to the atmosphere from fermentation and other processed gas, to environmentally acceptable levels without the use of excessive thermal energy and without the use of large quantities of cool, fresh water.

Another objective of this invention is to provide method and apparatus of the class described for the recovery of such compounds on a commercial scale.

The foregoing and other objects and advantages of this invention will appear from the following detailed description, taken in connection with the accompanying drawing of a preferred embodiment.

BRIEF DESCRIPTION OF THE DRAWING

The single figure is a diagram of an ethanol abatement system embodying the features of this invention.

DESCRIPTION OF THE PREFERRED EMBODIMENT

The embodiment of my invention shown in the drawing is an ethanol abatement system comprising a bread-baking oven 1, an adiabatic humidifier 2, and an evaporative/condensing heat exchanger 3 (hereinafter referred to as heat exchanger 3). Bread-baking oven gas passes from the oven, through oven exhaust stacks 4 and 5 and through duct 6 to the adiabatic humidifier 2. Water-vapo,r-saturated exhaust gas, containing small quantities of ethanol or other water soluble organic components such as acetone, passes from adiabatic humidifier 2 to heat exchanger 3 through duct 7.

The adiabatic humidifier 2 and its associated system consists of a tank 8, banks of fine-mist spray heads 9, a demister 10, a pump 11, a reservoir 12, a drain 13, interconnecting piping 14, and fresh-water makeup piping 15. Hot oven exhaust gas enters the adiabatic humidifier 2 at the base of tank 8 and passes upwards against the downward flow of the fine-mist spray, generated by spray heads 9, and then passes through a demister 10 which removes water droplets before the gas, saturated with water vapor, is discharged from tank 8 at its top through duct 7.

During the passage of hot oven exhaust gas through the adiabatic humidifier 2, heat is removed from the gas and water is evaporated from the fine-mist spray. In this process, energy is extracted from the gas and it is cooled. Because a small portion of the fine mist is vaporized, water vapor is added to the gas. This increases its moisture content. If the process is 100% efficient, the gas exits the adiabatic humidifier completely saturated. In practice, 100% efficiency cannot be achieved economically. However, the hereinafter described results are based on an efficiency of more than 95%, that is, the exhaust gas contains more than 95% of the moisture it can possibly hold at its exhaust temperature.

Spray nozzle pressure is supplied by pump 11. That spray nozzle water which is not evaporated during the adiabatic process collects at the bottom of tank 8 and is conducted by piping 14 to reservoir 12. In the process of adiabatic humidification, some ethanol is entrained in the unevaporated water. Accordingly, reservoir 12 contains some ethanol. A small fraction of the water circulating in piping 14 is siphoned from reservoir 12 through drain 13. Fresh water is introduced into reservoir 12 through piping 15 to compensate for the water discharged through drain 13 and the water evaporated in adiabatic humidifier 2. The process, therefore, continuously removes some ethanol contained in reservoir 12 and permits the spray water to entrain additional ethanol from the oven exhaust gas.

The cooled and saturated gas exiting the adiabatic humidifier 2 through duct 7 contains less ethanol by the amount contained in the water discharged through drain 13. In addition, the adiabatic humidifier 2 behaves much like a scrubber in that the spray water entrains particulates and deposits them in reservoir 12 from which they are discharged through drain 13.

The cooled and saturated gas enters the exhaust side (evaporation chamber 28) of heat exchanger 3. Except for the spray system in the condensation chamber 30, this heat exchanger is disclosed in U.S. Pat. No. 5,123,479 which is incorporated herein by reference. Condensation chamber 30 is so designated because the fluid within the Perkins tubes P condenses in this portion of the heat exchanger. The condensation chamber 30 defines an evaporation region wherein a portion of the fresh water sprayed onto the finned Perkins tubes in this region is evaporated. Also, evaporation chamber 28 is so designated because the fluid within the Perkins tubes evaporates in this portion of the heat exchanger. Accordingly, evaporation chamber 28 defines a condensing region for the exhaust gases.

In the present use of this heat exchanger, the moisture-laden gas entering from duct 7 into evaporation chamber 28 is reduced in temperature and, as a consequence, moisture is extracted from the gas. Blower 24 ensures that the airflow passes from the oven through duct 6, through the adiabatic humidifier 2, through duct 7, through the evaporation chamber 28 of heat exchanger 3, and out through the exhaust side of the heat exchanger 3.

When the temperature of the gas is reduced and moisture is extracted (condensed), heat is liberated. This heat is continuously transported by the action of the rotating Perkins tubes and deposited in the condensation chamber 30. Herein, water from reservoir 19 is caused to flow through piping 18 and the bank of fine-mist spray heads 16 by means of pump 20. The spray impinges on the finned Perkins tubes in this section. Some of the water evaporates. The amount of water which evaporates is a function of the dew point and airflow rate of the fresh air entering heat exchanger 3 by virtue of inlet-air blower 23 and by the temperature of the Perkins tubes in this section of heat exchanger 3.

It is desired to make the amount of moisture evaporated about the same as the amount of moisture condensed during the cooling of the gas entering heat exchanger 3 through duct 7. Cold air cannot hold as much moisture as warm air. The inlet air, introduced by blower 23, is considerably cooler than the air entering heat exchanger 3 through duct 7. Consequently, the airflow rate of blower 23 must be much higher than the airflow rate of blower 24 in order for the rates of water evaporation and water vapor condensation to be approximately equal. Since the heat of condensation is approximately equal to the heat of evaporation of water and since both processes are accompanied by relatively small changes in temperature for a given quantity of heat exchange, heat exchanger 3 is capable of extracting large amounts of thermal energy from the saturated warm gas entering through duct 7. Concomitantly, a large quantity of moisture can be extracted from this saturated warm gas.

Typically, the saturated warm air in duct 7 contains about 0.1 pound of water per pound of dry air and contains about 0.002 pound of ethanol per pound of dry air. That is, the ratio of water to ethanol is about 50 to 1. It has been found that, if the rate of water condensation is sufficiently intense, the initial condensate will contain about 1 pound of ethanol for every 50 pounds of water condensed, irrespective of the amount of dry air present. This phenomenon obtains despite the noncondensibility of ethanol by itself at typical ambient dew point temperatures.

Unfortunately, this ethanol concentration in the condensate can only be maintained during periods of intense condensation. When intense condensation is absent, equilibrating begins in accordance with well-known laws which state that in low ethanol concentrations in water solutions the vapor phase ethanol concentration is several times the liquid phase ethanol concentration at equilibrium. Accordingly, it is necessary immediately to remove the condensate from the condensing surface and collect it in a large volume and low surface area bulk such as reservoir 12. By accomplishing this, the major portion of the ethanol contained in the condensate during intense condensation is retained because of the constraints of the relatively slow process of ethanol diffusion from within the bulk fluid to the free surface which is in equilibrium with the vapor above the surface.

The finned Perkins tubes in evaporation chamber 28 of heat exchanger 3 are coated with a nonwetting material such as Teflon. Under these conditions, drop-wise condensation occurs which not only increases the intensity of condensation but eliminates thin films which cannot retain ethanol for significant periods of time. Additionally, the high-centrifugal forces, experienced during rotation, eject the condensate drops onto the inner surface shell 25 wherein they coalesce and the resulting stream is swept by the circumferential airflow to the bottom of heat exchanger 3 and out drain 22.

Blower 23 forces ambient air into condensation chamber 30 of heat exchanger 3 and blower 24 extracts spent oven gases from evaporation chamber 28. Seal 26 separates the evaporation and condensation chambers. Spray heads 16 inject a fine-mist water spray into the condensation chamber; however, only a small fraction of the sprayed water is evaporated. Because thin film evaporation is desired in condensating chamber 30 the finned Perkins tubes in this chamber are not coated with nonwetting films such as Teflon. The excess water is conducted away through drain 17. Since the positive pressure in condensation chamber 30 is higher than the negative pressure in evaporation chamber 28, a portion of the fresh water 27 passes through seal 26 and into evaporation chamber 28, there it dilutes the ethanol/water condensate further to assure retention of the ethanol in the water until the bulk water is able to escape heat exchanger 3 through drain 22.

The recovery of ethanol in the adiabatic humidifier system and in the heat exchanger system have been examined theoretically. It has been found that the recovery in a properly designed adiabatic humidifier is inversely proportional to the vapor pressure of ethanol at the temperature of the humidifier recirculating water and inversely proportional to the activity coefficient at the recirculating water temperature. The activity coefficient slowly increases as temperature increases for water-soluble organic compounds such as methanol, ethanol, acetone, etc. The vapor pressure, however, increases rapidly as temperature increases. For ethanol, the vapor pressure increases an order of magnitude for a temperature increase from 60° F. to 140° F. In the abatement system shown in the drawing, the recirculating water temperature is determined by the heat balance. However, if a separate cooling system is provided for the adiabatic humidifier recirculating water, an increase in recovery will be obtained since the ethanol vapor pressure will be decreased.

The recovery in the heat exchanger system is inversely proportional to the product of the ethanol vapor pressure at the exhaust air temperature and the dry airflow divided by the rate of water condensation. If the rate of water condensation is zero, the recovery will be zero. This is true at ordinary temperatures. If the airstream is refrigerated, then it is possible to condense ethanol at its dew point. However, because the concentration of ethanol is about 0.0025 pounds of ethanol per pound of dry air, the condensation temperatures are, consequently, far below what can ordinarily be achieved using typical ambient air temperatures. In order to achieve lower temperatures, a refrigeration system would be required.

In the recovery system shown in the drawing, the adiabatic humidifier not only recovers some ethanol, it also adds water to the airstream which subsequently is condensed by the heat exchanger, thereby enhancing the recovery of ethanol in the heat exchanger system. Furthermore, the adiabatic humidifier saturates the oven air entering the heat exchanger, thereby permitting all heat exchange to take place in the more efficient condensing mode of heat transfer. This improves the effectiveness of the heat exchanger and lowers the exhaust air temperature, improving recovery.

The analyses indicate that, for acceptable recovery of the system shown in the drawing, the drain flow from the adiabatic humidifier should be below 25% of the flow through its spray nozzles, the saturation temperature exiting the adiabatic humidifier should be greater than 125° F., the exit oven air temperature from the heat exchanger should be less than 95° F., the seal bypass flow from the condensation chamber 30 through seal 26 into evaporation chamber 28 should be greater than 1.75 gpm for every 1000 dry standard cubic feet per minute (DSCFM) blower 24 airflow, and the blower 23 condensation chamber airflow should be more than 5 times the blower 24 evaporation chamber 28 airflow. Under these restrictions, the abatement system of the drawing will use about 50% of the fresh water required by a counterflow packed column.

EXAMPLE

An ethanol abatement system, substantially as shown in the drawing, was installed in the exhaust side of a 5 million Btu/hr, single-lap, tray-type, white-bread baking oven. The maximum capacity of this oven is 5 tons of white bread per hour and the combined exhaust airflow rate from stacks 4 and 5 is 1350 dry standard cubic feet of air per minute (DSCFM). The temperature of the combined airflow entering at the base of adiabatic humidifier 2 was measured to be 233° F. during this testing. This is a reduction from the 305° F. average oven exhaust duct airstream temperature because of heat losses in uninsulated duct 6 to the surrounding air temperature which was 69° F. and 67% relative humidity at this time.

Adiabatic humidifier 2 consists of a vertical steel shell 39 inches in diameter and 96 inches high. It contains two banks of spray heads 9 and each bank contains 8 Bete Fog Nozzle, Inc., Type L80, spray nozzles. A demister 10 (impingement separator; wave plate type) is located at the top and within the steel shell. Pump 11 supplies 24 gallons of water per minute (gpm) at 92 pounds per square inch of pressure to the aforementioned banks of spray heads. Since some water vaporization occurs, 23.67 gallons of water per minute is discharged from the adiabatic humidifier through piping 14 into reservoir 12. In this installation, 4.31 gpm of reservoir 12 water is discharged through drain 13. The fresh water makeup required by reservoir 12 is obtained from fresh water source 29 through piping 15 at a flow rate of 4.64gpm. Fresh water makeup for reservoir 19 is supplied through piping 21.

The humidified oven exhaust air exists adiabatic humidifier 2 at its top and was at a temperature of 126° F. during this testing. A humidity meter installed in duct 7 indicated that the exhaust air was almost completely saturated. Saturated humidified air at a temperature of 126° F. enters evaporation chamber 28 of heat exchanger 3 through duct 7. This air passes radially inward through the cooled-rotating Perkins tubes and is discharged from the center of evaporation chamber 28 by blower 24. The humid gas entering heat exchanger 3 contains 0.0985 pounds of moisture per pound of dry air, and the saturated gas exhausted by blower 24 is at a temperature of 95° F. and contains 0.0368 pounds of moisture per pound of dry air. Except for a small infusion of fresh air through seal 26 from the condensation chamber 30, the pounds per hour of dry air entering heat exchanger 3 is about the same as the pounds per hour of dry air discharged. The water condensed in evaporation chamber 28 of heat exchanger 3 is, therefore, 375 pounds per hour. The Perkins tubes in evaporation chamber 28 were coated with Heresite baked phenolic coating P-413 to ensure dropwise condensation.

The amount of ethanol contained in reservoir 12 was analyzed by an independent medical laboratory using a gas chromatograph equipped with a flame ionization detector and having head space sampling capability. The technique used was the same as that used in forensic toxicology. The reported results were 0.25 weight percent of ethanol in reservoir 12 fluid. At a drain 13 flow rate of 4.31 gpm, the pounds per hour of ethanol discharged from reservoir 12 was 5.40.

The flow rate in drain 22 consisted of the aforementioned 375 pounds per hour (0.75 gpm) of condensate in evaporation chamber 28 plus 2.37 gpm (27) of crossflow through seal 26 between condensation chamber 30 and evaporation chamber 28 in heat exchanger 3. The total flow rate in drain 22 was 3.12gpm. The aforementioned independent medical laboratory analyzed a sample of drain 22 fluid and reported that it contained 0.28 weight percent of ethanol. At a drain flow rate of 3.12 gpm, the pounds per hour of ethanol discharged from drain 22 was 4.37. Therefore, the total ethanol discharged from drains 13 and 22 was 9.77 pounds per hour.

The total fresh water usage 29 was 7.7 gpm during this testing.

Blower 23 supplied 10,000 DSCFM of fresh air to condenser chamber 30 of heat exchanger 3. Liquid pump 20 produced a flow rate in piping 18 at a pressure of 100 pounds per square inch. The equilibrium temperature of the water in reservoir 19 was 70° F. during this testing. The flow rate of 15 gpm at 100 pounds per square inch provided the required conditions for the 12 Lechler, Inc. No. 216.276.17BE axial hollow-cone nozzles in spray heads 16. These nozzles were located circumferentially on the,rotating shaft of heat exchanger 3. The fresh air temperature was 69° F. and its relative humidity was 67%, therefore, the dew point was 62° F. This fresh air contained 0.01192 pound of moisture per pound of dry air. The Perkins finned tubes were ordinary aluminum which was observed to properly wet; that is, to form a film of water on the finned surfaces required for efficient evaporation. These tubes extracted heat from condensation chamber 30 and evaporated about 0.74 gpm of the water sprayed into condensation chamber 30. The heat extracted from evaporation chamber 28 and transported through the rotating Perkins tubes to the condensation chamber 30 was approximately 420,000Btu/hr.

The United States Environmental Protection Agency issued document EPA 453/R-92-017 dated December 1992 and entitled Alternative Control Technology Document for Bakery Oven Emissions. Therein, on page 2-19, a predictive equation, obtained by a multiple step-wise linear regression analysis of testing results, is given for total volatile organic carbon emissions based on 20 tests of four typical baking industry ovens. The tests were performed employing EPA's Test Methods 18 to quantify total organic carbon and 25A to speciate the constituents of the oven exhaust gases for various initial maker's percent yeast and yeast action time and for various spike baker's percent yeast and spiking time. The equation gives the total volatile organic (including ethanol, acetaldehyde, glyceral, organic acids, etc.) in pounds per ton of baked bread. Based on other experimental work, it has been determined that ethanol consists of 92% of all volatile organic carbon emissions from typical baking ovens in the United States. This has been demonstrated to be accurate on the oven of this example by testing by an independent commercial organization in accordance with EPA's Test Method 18.

During this present testing, the baker's percent yeast was 2.56%, the yeast action time was 3.17 hours, the spike yeast was 1.0%, and the spiking time was 1.17 hours. By actual count, the oven was processing 5860 loaves of white bread per hour and each loaf of bread weighed 22 ounces. Using the aforementioned EPA equation, the total volatile organic carbons emitted by fermentation and exhausted through the baking oven stacks was 3.43 lbs/ton of baked bread or 13.82 pounds for 4.03 tons of white bread processed per hour. The amount of ethanol emitted was 92% of this or 12.71 pounds per hour. The recovery of ethanol from the oven exhaust airstream is simply the ratio of 9.77 pounds per hour of ethanol discharged through drains 13 and 22 divided by the total ethanol emitted during the baking process or 9.77/12.71=76.9%. This recovery was obtained by the usage of fresh water at the rate of 8.4 gpm and ambient air at the rate of 10,000 SCFM.

It will be apparent from the foregoing that this invention provides method and apparatus by which to recover ethanol and other volatiles from bakery and other plant emissions on a simplified and economical basis which affords recovery on a commercial scale.

It will also be apparent to those skilled in the art that various changes may be made in the structural arrangement of components of the apparatus and variations in the process steps. For example, thermal insulation may be provided for the humidifier to render it fully adiabatic. In practice, thermal insulation may be omitted while still rendering the humidifier substantially adiabatic. This and other changes may be made without departing from the spirit of this invention and the scope of the appended claims.

I claim:

1. The method of recovering water soluble, volatile organic compounds from bakery and other plant emissions, comprising:

a) passing the emissions through spray water liquid from spray nozzles in a substantially adiabatic humidifier for humidifying the emissions to substantially saturation conditions of at least 95%, b) collecting the non-evaporated humidifier spray water liquid in a reservoir, removing a portion of the reservoir liquid for recovering said compounds contained therein, replenishing the removed portion of reservoir liquid with fresh water, and recirculating the reconstituted reservoir liquid back to the spray nozzles, c) passing the substantially saturated emissions from the humidifier to a rotating heat exchanger having vaporization and condensation chambers housing a plurality of Perkins tubes containing heat exchange fluid, d) providing the Perkins tubes with a non-wetting outer surface in the vaporization chamber to effect drop-wise condensation of said saturated emissions, whereby to reduce the temperature of the emissions and extract condensate therefrom for recovering said compounds therein, e) providing the Perkins tubes with a wettable outer surface in the condensation chamber to effect thin film evaporation of liquid coolant by the heated fluid in the Perkins tubes, and f) spraying liquid coolant onto the wettable outer surface of the Perkins tubes in the condensation chamber to effect vaporization of thin film liquid coolant sprayed 30 thereon.

2. Apparatus for recovering water soluble, volatile organic compounds from bakery and other plant stack emissions, comprising:

a) a substantially adiabatic humidifier having an inlet coupled to the plant stack for receiving stack emissions therefrom, an outlet for carrying substantially saturated humidified emissions of at least 95%, spray nozzles in the humidifier, a reservoir for receiving the non-evaporated spray nozzle liquid from the humidifier, means for extracting a small portion of the non-evaporated spray liquid and said compounds contained therein for recovering said compounds, means for making up the quantity of extracted liquid with fresh water, and means for circulating the reconstituted reservoir liquid to the spray nozzles, b) a rotating heat exchanger having vaporization and condensation chambers housing a plurality of Perkins tubes containing heat exchange fluid, the Perkins tubes having a non-wetting outer surface in the vaporization chamber to effect drop-wise condensation of saturated emissions from the adiabatic humidifier, c) a liquid outlet in the vaporization chamber for collecting liquid condensate in droplet form for recovering said compounds therefrom, d) the Perkins tubes having a wettable outer surface in the condensation chamber to effect thin film evaporation of liquid coolant by the heated fluid in the Perkins tubes, and e) coolant liquid spray means in the condensation chamber for spraying coolant liquid onto the wettable outer surface of the Perkins tubes in the condensation chamber, for effecting vaporization of the thin film liquid coolant sprayed thereon.

3. The apparatus of claim 2 including passageway means between the evaporation and condensation chambers for passage of coolant liquid spray in the condensation chamber to the vaporization chamber and the liquid outlet therein.

* * * * *